UNITED STATES PATENT OFFICE.

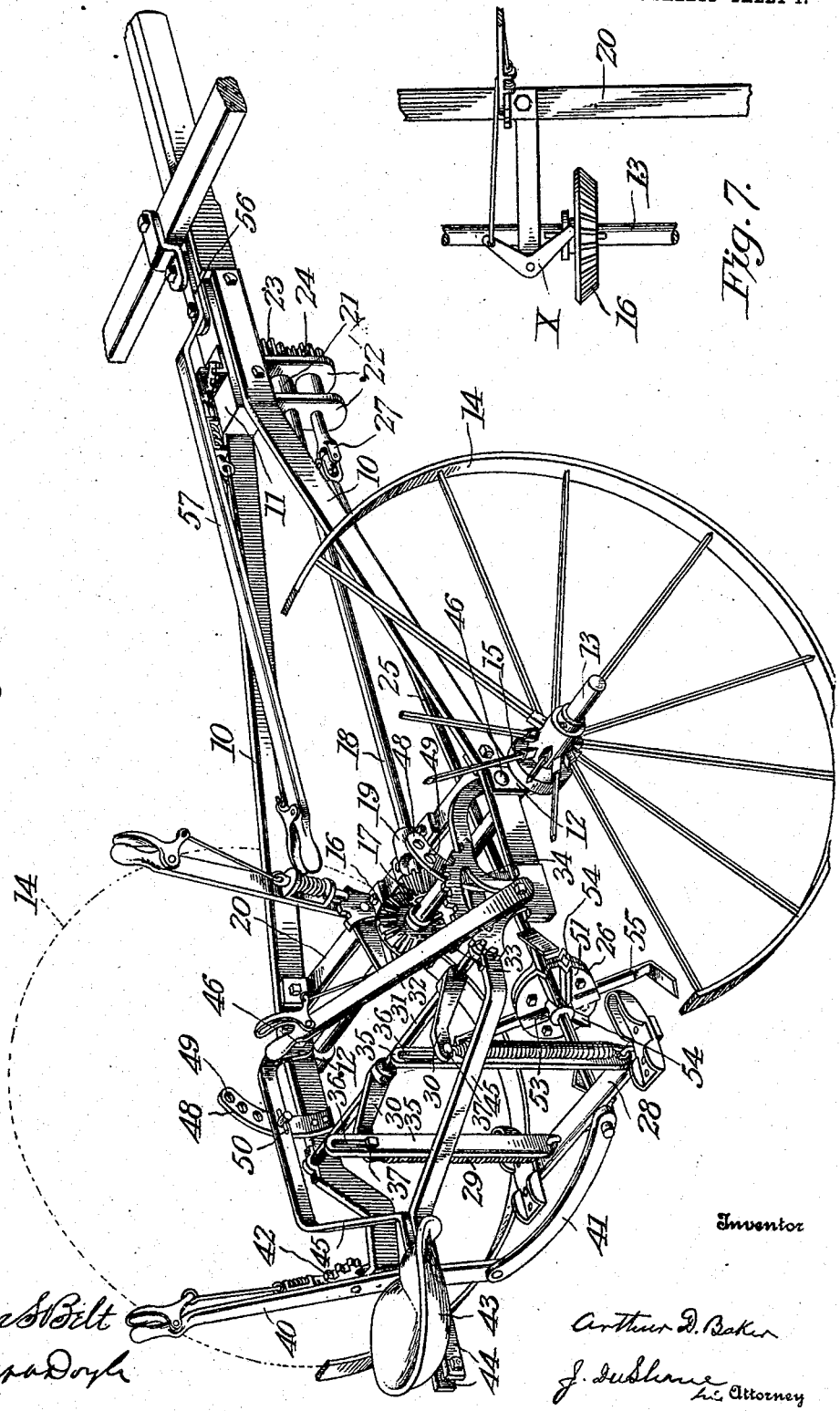

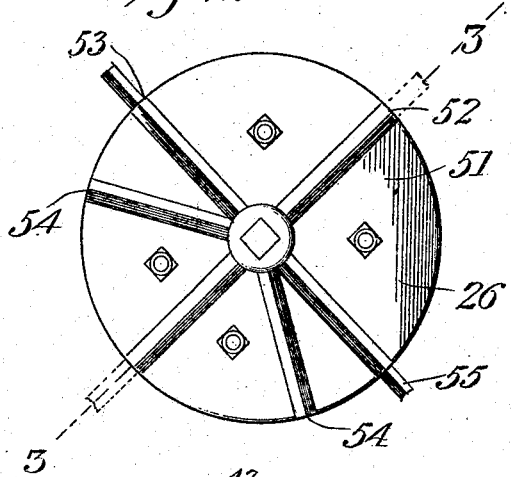
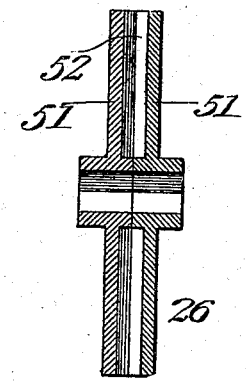
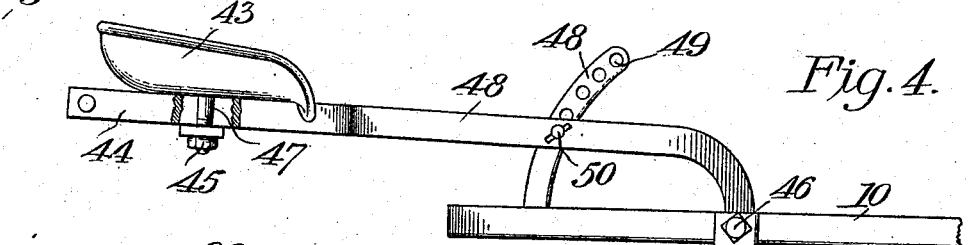
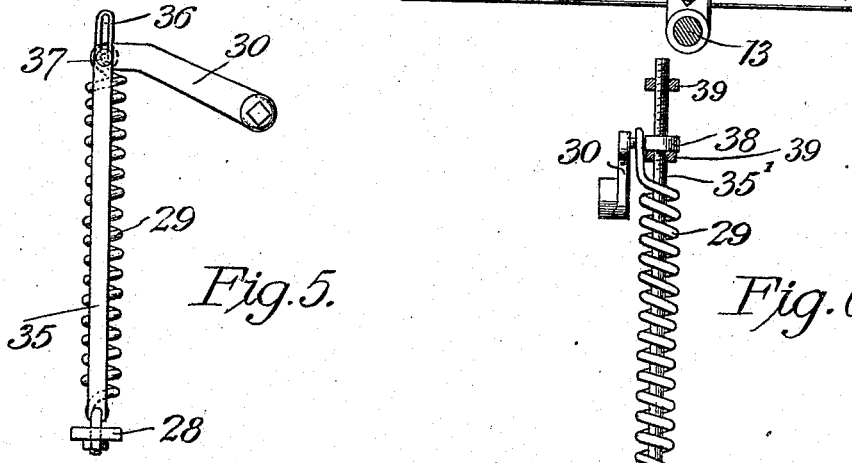
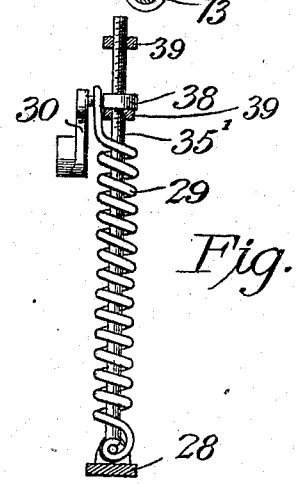

ARTHUR D. BAKER, OF SOUTH BEND, INDIANA.

COTTON-CHOPPER.

936,693.  Specification of Letters Patent.  Patented Oct. 12, 1909.

Application filed April 18, 1908. Serial No. 427,823.

*To all whom it may concern:*

Be it known that I, ARTHUR D. BAKER, a citizen of the United States, residing at South Bend, in the county of St. Joseph and State of Indiana, have invented certain new and useful Improvements in Cotton-Choppers, of which the following is a specification.

This invention relates to certain new and useful improvements in cotton choppers.

The invention has for its object the production of improved supporting means for the chopping hoes and for regulating the depth of cut thereof.

A further object is to provide means for supporting the driver or operator, said means being adjustable to conform to different persons and also to serve as a balancing means for the tongue of the vehicle.

A further object is to provide a chopping device which can be adjusted to vary the intervals between the cuts.

The invention will be hereinafter fully set forth and particularly pointed out in the claim.

In the accompanying drawings:—Figure 1 is a perspective view illustrating my improved cotton chopper. Fig. 2 is an enlarged side view of the hoe carrier. Fig. 3 is a sectional view thereof on line 3—3, Fig. 2. Fig. 4 is a detail view of the seat and its adjustment. Fig. 5 is a detail view illustrating means for regulating the depth of the cut. Fig. 6 is a similar view of a slight modification. Fig. 7 is a detail.

Referring to the accompanying drawings in which like characters of reference designate corresponding parts, 10 designates a frame formed of two bars joined at their forward ends to the tongue 11, from which they diverge rearwardly in an approximately A-shape. Said frame is provided with bearings 12 supporting a rotatable axle 13 which is driven by the traction wheels 14. Said wheels are adjustable along the axle 13 to vary the thread, in any of the well-known ways. Mounted on the axle 13 is a beveled pinion 16 meshing with a smaller pinion 17 carried by a shaft 18 supported at its rear end in a bearing 19 carried by a cross bar 20, and at its forward end in a bearing 21 carried by depending fingers 22 secured to the underside of the forward portion of frame 10. A suitable clutch X serves to shift the position of said pinion 16. Said shaft is provided at its forward end with a pinion 23 meshing with a similar pinion 24 secured to the driving shaft 25. On this shaft 25 is the hub 26 composed of two disks having coincident oppositely disposed outward bends forming sockets to receive the shanks of the hoes, as seen clearly in Fig. 1. The shaft 25 near its forward end is provided with a gimbal joint 27, the rear end of said shaft being journaled in a cross bar 28. Said bar is provided with foot rests and is supported by springs 29 suspended from arms 30 secured to a shaft 31 mounted in frame 10. The position of said arms is controlled by means of a hand lever 32 provided with a pawl 33 engaging a toothed quadrant 34. In order to limit the movement of bar 28 with relation to arms 30 I connect bars 35 with said cross bar and provide each bar near its upper end with a slot 36 through which a pin 37, carried by the adjacent arm 30, is projected. Said bars 35 may be arranged beside the springs 29 as shown in Fig. 1, or inside the springs as illustrated in Fig. 5. Or if desired, the construction illustrated in Fig. 6 may be employed, in which form a ring 38 is carried by each arm 30 and the threaded end of bar 35′ is passed therethrough. The desired adjustment is secured through the medium of nuts 39. Lateral movement of the hoe member is obtained by means of a lever 40 connected to cross bar 28 by a link 41. Said lever is held in any adjusted position by the usual pawl and quadrant 42.

The seat 43 for the operator is supported upon the parallel portions 44 of bars 45, the forward ends of which are pivotally supported at 46 in frame 10. Said seat is provided with a threaded stud 47 depending between the parallel portions 44 and secured in any adjusted position by means of a nut 45. Vertical adjustment of bars 45 is secured in any suitable manner, such for instance as the segmental bars 48 provided with perforations 49 adapted to receive pins 50 carried by said bars 45.

The hoe carrier comprises two disks 51 bolted together and provided with grooves 52, 53 and 54 arranged to receive the shanks of hoes 55. It will be observed that the grooves 52 and 53 are so arranged that four hoes may be used, while the arrangement of grooves 52 and 54 is such that only three hoes need be used, if desired.

A break joint 56 is formed in the tongue 11 to permit the team to travel between the rows of plants, when desired, said joint being controlled by the lever 57 in convenient reach of the operator.

In practice the seat is adjusted along the bars 45 so that the tongue may be balanced by the driver, and the said bars 45 are also adjusted vertically to compensate for varying lengths of limb of the operator, and height of the team. The spring suspension of the cross bar 20 serves to maintain a uniform depth of cut, even when the rows rise and fall in uneven land and to prevent too deep a cut, the slotted bars 35 are provided. By varying the number of hoes the interval between cuts is correspondingly varied, and a greater or smaller number of plants will be left in the rows, as desired. It is obvious from what has been said that the hoe member is put into operation as soon as the pinion 16 is clutched to the axle, and said hoe carrier may be made to follow crooked rows by means of the lever 40.

I claim as my invention:—

In a cotton chopper, a frame, traction wheels supporting the same, a transverse shaft mounted on the frame, arms extending rearwardly and secured to said shaft, pins carried by the rear ends of said arms, a rearwardly extended inclined shaft, hoes carried thereby, a cross bar having a bearing in which said driving shaft is journaled, vertical bars carried by said cross bar and having vertical slots at their upper ends receiving said pins, springs connecting said cross bar with said pins, said cross bar carrying foot rests, a revoluble shaft to which said traction wheels are attached, a forwardly extending shaft operatively connected with the axle, and means for operating said driving shaft from said forwardly extending shaft, there being a gimbal joint between said driving shaft and its actuating means.

In testimony whereof I affix my signature, in presence of two witnesses.

ARTHUR D. BAKER.

Witnesses:
 ADOLPH S. GINZ,
 JOHN M. STAPLES.